Feb. 28, 1939. H. P. PHILLIPS 2,148,997
PISTON RING
Filed April 16, 1936
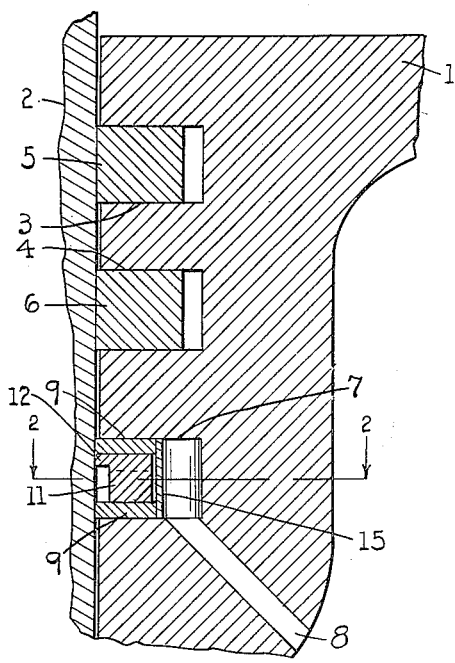
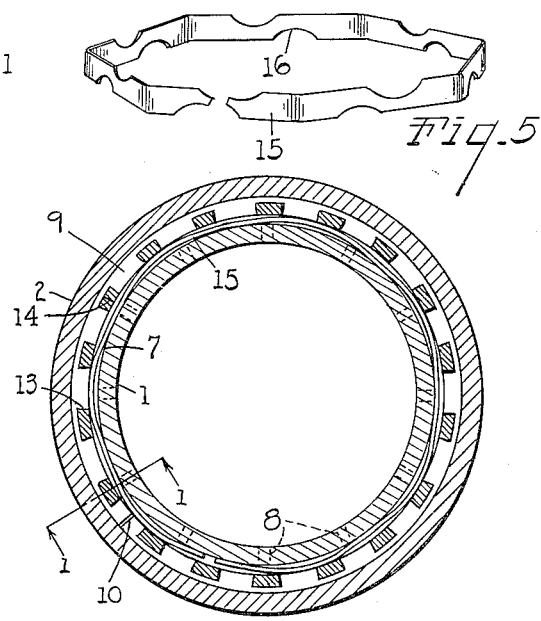
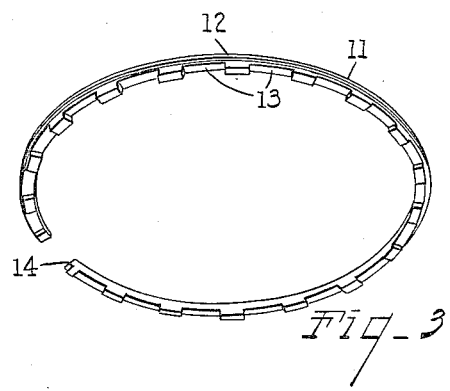
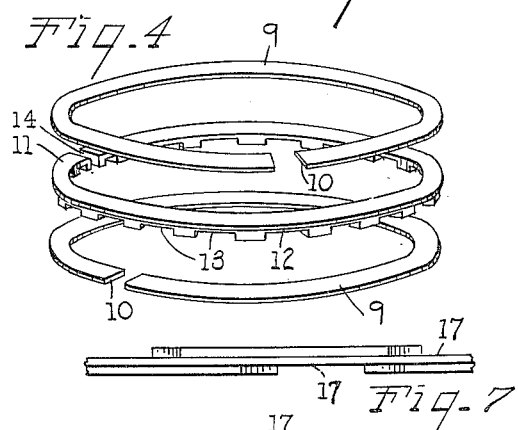
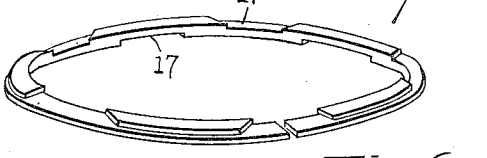
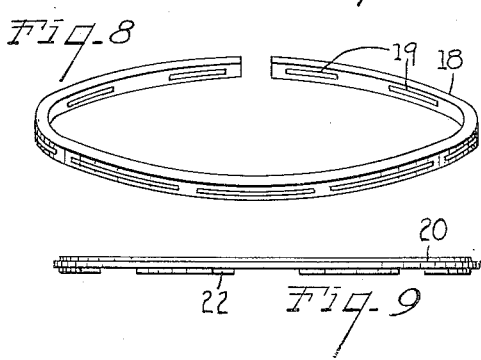
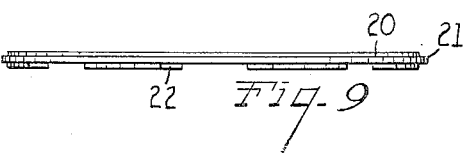
INVENTOR.
Harold P. Phillips
BY Chappell, Earl & Chappell
ATTORNEYS Patented Feb. 28, 1939

2,148,997

UNITED STATES PATENT OFFICE 2,148,997

PISTON RING

Harold P. Phillips, Hastings, Mich., assignor to Hastings Manufacturing Company, Hastings, Mich.

Application April 16, 1936, Serial No. 74,654

16 Claims. (Cl. 309—45)

This invention relates to improvements in piston rings.

The main objects of this invention are:

First, to provide an improved piston ring assembly which is highly efficient both from the standpoint of effective sealing and also from the standpoint of oil control.

Second, to provide a piston ring assembly which "wears in" very quickly and at the same time is very durable.

Third, to provide a piston ring or piston ring assembly which is highly efficient for use in oversize or rebored or worn cylinders.

Objects relating to details and economies of my invention will appear from the description to follow. The invention is defined and pointed out in the claims.

Structures which are preferred embodiments of my invention are illustrated in the accompanying drawing, in which:

Fig. 1 is a fragmentary longitudinal section on line 1—1 of Fig. 2, of a cylinder and piston provided with a ring assembly embodying the features of my invention, no attempt being made to show the parts in their relative proportion, the ring elements being shown substantially enlarged for convenience in illustration.

Fig. 2 is a section on line 2—2 of Fig. 1.

Fig. 3 is a perspective view of the intermediate or spacer element of my ring assembly.

Fig. 4 is a perspective view of the elements of the assembly in disassembled or separated relation.

Fig. 5 is a perspective view of an inner or expanding spring member associated with my spring assembly.

Fig. 6 is a perspective view of a modified form of spacer or intermediate member.

Fig. 7 is an edge view of the modified form of Fig. 6.

Fig. 8 is a perspective view of a further modified form of spacer.

Fig. 9 is an edge view of a still further modified form of spacer.

In the embodiment of my invention illustrated in Figs. 1 to 4, inclusive, 1 represents the piston of an internal combustion engine and 2 the cylinder thereof. The piston is provided with grooves 3 and 4 which are illustrated as being provided with the conventional type of compression rings 5 and 6. These are shown merely to indicate the usual relation of the parts to the oil ring piston groove 7 which is provided with drain passages 8.

My improved ring assembly is installed in the groove 7 and comprises a pair of spaced thin steel expansible side members 9 disposed to present their edges to the cylinder wall. In practice, these members are formed of flat steel stock rolled edgewise. These members have splits or joints 10 as is clearly illustrated in Fig. 4, and are formed so that when in position in the piston they are under compression and urged yieldingly outward by their own tension.

The members 9 are held in spaced relation by the intermediate or spacer member 11 formed of cast iron and provided with a top annular or continuous relatively narrow rib-like cylinder contacting portion 12. The combined thickness of the members 9 and the intermediate or spacer member 11 is such as to properly fit the piston ring groove 7—that is, it is a reasonably close fit therein and at the same time permits expansive movement without binding. The spacer member has slot-like radial recesses or openings 13 in the lower side thereof, which provide communicating openings for the space between the lower member 9 and cylinder contacting portion 12 of the intermediate member 11 with the bottom of the piston ring groove 7 and consequently with the drain openings 8. The member 11 is also an expansible member having a split at 14.

By forming the members 9 of steel and the member 11 of cast iron, I provide an assembly which has the advantage of quick "wearing in" and consequent highly effective sealing shortly after installation, and long life as well as highly effective control of lubricant. The intermediate member, presenting a relatively narrow peripheral surface to the cylinder wall with the relatively high unit pressure, quickly "wears in" or conforms to the cylinder and maintains its sealing efficiency or efficiency against "blow-by" until the steel members 9 have "worn in" and become entirely effective as sealing means or in preventing "blow-by".

In practice, I have found an assembly to be very effective when the members 9 are formed of stock or are of .020 to .032 inch thickness and the cylinder contacting portion 12 of the intermediate member of .020 to .032 inch thickness. This may be varied considerably, but one of the advantages of the assembly is that the members 9 are relatively thin as is also the cylinder contacting portion of the intermediate member. The combination of steel and cast iron sealing elements is highly effective both from the standpoint of quick "wearing in" and also from the standpoint of long life and effective sealing.

In the embodiment illustrated, I provide an expanding spring 15 which is arranged in the bottom of the piston groove 7 to urge the piston ring members 9 yieldingly outward. As illustrated in Fig. 1, there is a slight radial space between expanding spring 15 and spacer ring 11. This expander is of the sinuously bent type providing a series of spring portions engaging the bottom of the groove and the steel piston ring members. This expanding ring is not an essential, particularly on new installations, but is sometimes desirable where my improved ring assembly is used in worn or rebored cylinders or where it is desired to increase the so-called unit pressure of the ring members or the tension of the ring members with the cylinder walls. I have found that when the spring is employed the added pressure exerted on steel rings 9 causes the wear on rings 9 and on spacer 11 to be approximately uniform. The expansion spring 15 is provided with edge or other openings 16 for the passage of lubricant to the bottom of the groove. Such expanding springs, broadly considered, are known in the art.

In the embodiment illustrated in Figs. 6 and 7, I dispose the continuous rib-like cylinder contacting portion 12 centrally of the spacer ring 11, the spacer being milled above and below the rib-like portion to provide oil drainage passages 17. Preferably, the passages 17 are arranged in alternating or staggered relation on opposite sides of member 11, so that the member is not unduly cut away or weakened thereby. If desired, the passages or recesses 17 may be formed similarly to the passages 13 of the preferred construction.

The spacer ring 11 formed with passages or recesses on opposite sides of a central cylinder contacting rib-like portion, as just described, functions similarly to the preferred type. I have, however, found that in the preferred construction, wherein the upper steel ring 9 and rib-like portion 12 of spacer 11 form a laminated cylinder contacting surface, an increase of twelve per cent in efficiency over the spacer having a central rib is present.

In the embodiment shown in Fig. 8, the intermediate or spacer element 18 is provided with a series of central slot-like drain openings 19. This spacer element is designed to be substituted for the spacer element 11 and is therefore not shown in assembled relation to the members 9.

In the modification shown in Fig. 9, the intermediate or spacer element 20 has the peripheral wall contacting portion 21 corresponding to the portion 12 of the modification shown in Figs. 6 and 7, but the drainage openings 22 are provided on one side only.

In all of these embodiments, the spacing or intermediate member is of suitable cast iron, bronze, or steel, whereas the side members are preferably of thin steel.

My improved composite piston ring or ring assembly is highly efficient both from the standpoint of oil control and also from the standpoint of sealing or "blow-by" prevention. It is desirable for use in new engines and is especially desirable for use with old or worn cylinders and pistons or rebored or reground cylinders and pistons. As I have pointed out, it has the advantage of quickly "wearing in" for effective sealing and at the same time great durability. It is also to be noted that the ribbon-like ring members 9 which are shown of exaggerated thickness in the drawing for convenience in illustration present only a relatively narrow contacting area or surface to the expander 15 and consequently only a relatively small portion of the expander is subject to wear. This is of very great practical advantage and importance for the reason that the life of the ring assembly is greatly prolonged owing to the fact that such wear as occurs on the expander does not materially weaken the expander owing to the zone of wear being so restricted. For illustration, when the wear extends entirely across the expander or embraces a substantial portion of its width, it is greatly weakened or its tension is greatly affected by such wear. With the arrangement of parts as in applicant's invention, the desired unit pressure of the ring may be had and is maintained for a very long period of time. Further, wide experience has demonstrated that the wear, even on the restricted contact zones, is substantially less than in cases where there is a relatively wide contact area between the expander and the ring element acted upon by it. It is my opinion that this results from the narrow contacting surfaces being less likely to accumulate and retain abrasive materials such as carbon and dirt.

Another advantage of my compound ring assembly is that with the thrust of the expander only upon the thin ribbon-like members 9, the desired unit pressure may be obtained by a lighter expander than is required when the expander acts upon a relatively wider element. The lighter expander springs or elements rendered practical by applicant's improvements are found to be highly responsive in action as compared to the heavier expander elements.

In the preferred embodiment shown in Figs. 1 to 5, it will be noted that the upper side member 9 is supported between the upper walls of the groove and the upper flat side of the spacer member from which the cylinder contacting portion 12 extends with a result that the upper member 9 of the ring assembly is in effect supported in an individual groove. Assemblies with this spacer member are found to be considerably more efficient than assemblies in which the cylinder contacting portion is disposed centrally as at 21, see Fig. 9.

I have illustrated and described certain embodiments or adaptations of my improvements which I find highly satisfactory. I have not attempted to illustrate or describe other embodiments or adaptations which I contemplate as it is believed that this disclosure will enable those skilled in the art to embody or adapt my improvements as may be desired.

Having thus described my invention, what I claim as new and desire to secure by Letters Patent is:

1. A piston ring assembly comprising spaced thin steel expansible side members disposed to present their edges to a cylinder wall, an intermediate cast iron expansible spacer member disposed between said side members, said intermediate member having a peripheral relatively narrow cylinder contacting rib portion and side drainage openings providing lubricant passages between the said intermediate and a side member, and an expanding spring arranged within said side and intermediate members in supporting engagement with said side members only and acting to urge them yieldingly outward.

2. A piston ring comprising a pair of split ring members formed of thin steel disposed flatwise, an intermediate split ring of cast iron between said steel ring members and provided with a narrow cylinder engaging portion, and an inner expanding spring contacting said steel ring members only.

3. A piston ring comprising spaced thin steel expansible sealing side members disposed edgewise to present their edges to a cylinder wall, and a cast iron expansible spacer member disposed between said sealing members, said spacer member having a thin continuous peripheral rib-like wall contacting portion in side contacting relation to one of said steel sealing members, and an expanding spring arranged within said side members in supporting engagement therewith and acting to urge them yieldingly outward, said spacer member having an internal diameter greater than that of the internal diameters of said side members so that the thrust of the sealing spring is sustained entirely by the said side members.

4. A piston ring assembly comprising spaced thin steel expansible side members disposed to present their edges to a cylinder wall, and an intermediate cast iron expansible spacer member disposed between said side members, said intermediate member having a peripheral relatively narrow annular cylinder contacting portion, and an expanding spring arranged within said side members in supporting engagement therewith and acting to urge them yieldingly outward, said intermediate member being out of supporting engagement with said expanding spring.

5. A piston ring assembly comprising spaced thin side members flat on both sides disposed to present their edges to a cylinder wall, an intermediate spacer member disposed between said side members, said intermediate member having a peripheral relatively narrow cylinder contacting rib portion and having drainage openings providing for the passage of lubricant, and an expanding spring arranged within said side and intermediate members in supporting engagement with said side members only and acting to urge them yieldingly outward, said intermediate member being of relatively soft metal as compared to said side members.

6. A piston ring assembly comprising spaced thin split side members disposed to present their edges to a cylinder wall, an intermediate spacer member provided with a cylinder wall engaging centering portion, said side and intermediate members being disposed side by side for free independent radial movement, and an inner expanding spring in supporting engagement with said side members only and acting to urge them yieldingly outward, said side members being of relatively hard material whereby to withstand the high unit wall tension characterizing the same without excessive wear of the side members.

7. A piston ring assembly comprising spaced split thin side members disposed to present their edges to a cylinder wall, an intermediate member, said members being disposed side by side for free independent radial movement, and an expanding spring arranged within said side and intermediate members and acting on said side members only to urge said side members against a cylinder wall, said side members being of relatively hard material whereby to prevent excessive wear thereof under the high unit wall tension characterizing the same, the combined axial thickness of said side members being substantially less than the axial distance between the same.

8. A piston ring comprising a pair of thin split ring members flat on both sides and disposed to present their outer edges to a cylinder wall, an intermediate spacer member disposed between but free from interlocking engagement with said side members, the combined axial thickness of said side members being substantially less than the axial distance between the same, and an inner expanding spring contacting said side members only.

9. A piston ring assembly comprising flat thin split ring side members disposed to present their edges to a cylinder wall, the axial thickness of said individual members being substantially less than the axial distance between the same, an intermediate split ring member disposed between said side members and having a restricted cylinder contacting portion, and an expanding spring contacting with said side members only, said side members being capable of expanding and contracting movement independently of each other and of said intermediate member.

10. A piston ring comprising a pair of split ring members formed of thin relatively hard metal disposed flatwise, said members being flat on both sides, an intermediate split ring of relatively soft material disposed between said side members and provided with a narrow cylinder engaging portion, and an inner expanding spring contacting said side members only.

11. A piston ring assembly comprising flat thin side members spaced axially from one another a distance substantially greater than the axial thickness of said members, an intermediate split ring member disposed between said side members and an inner expanding spring contacting with said side members only.

12. A compound ring assembly comprising a pair of ribbon steel ring members disposed flatwise, a vented cast iron ring member disposed therebetween, and an expander adapted to press outwardly at least one of said ring members when the ring assembly is in use.

13. A piston ring assembly comprising a pair of ribbon-like side members disposed to present their edges to a cylinder wall, and a relatively thick intermediate member having a relatively narrow cylinder engaging portion adapted for relatively quick wearing in adaptation to a cylinder wall, at least one of said side members having an expander acting to urge it to cylinder contacting position.

14. A piston ring assembly comprising spaced split thin side members disposed to present their edges to a cylinder wall, a vented intermediate member, said members being disposed side by side for free independent radial movement, and an expander adapted to press outwardly at least one of said side members, said side members being of wear resisting material whereby to prevent excessive wear thereof under high unit wall tension, the combined axial thickness of said side members being less than the axial distance between them.

15. A piston ring assembly comprising spaced split thin side members disposed to present their edges to a cylinder wall, an intermediate member having axially spaced cylinder contacting portions and oil vents between said portions, and an expander adapted to press outwardly at least one of said members, said side members being of wear resisting material whereby to prevent excessive wear thereof under high unit wall tension, the combined axial thickness of said side members being less than the axial distance between them.

16. A piston ring assembly comprising a cast iron split ring member having a relatively narrow rib-like annular cylinder contacting portion and oil vents below said portion, a thin steel split ring member disposed flatwise in engagement with at least one face of said cast iron member, and an inner expanding spring contacting at least said steel side member.

HAROLD P. PHILLIPS.

DISCLAIMER 2,148,997.—*Harold P. Phillips*, Hastings, Mich. PISTON RING. Patent dated February 28, 1939. Disclaimer filed June 11, 1943, by the assignee, *Hastings Manufacturing Company*.

Hereby enters this disclaimer to claims 2 to 16 inclusive.

[*Official Gazette July 6, 1943.*]